May 16, 1967 C. J. P. SMITH 3,319,988
APPARATUS FOR MANUALLY DIGGING OUT SODS OF TURF
Filed Jan. 28, 1965 2 Sheets-Sheet 2
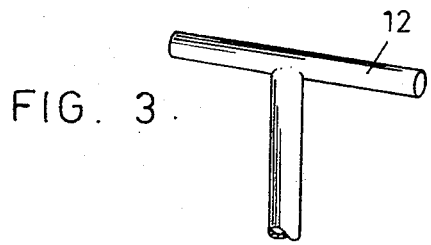
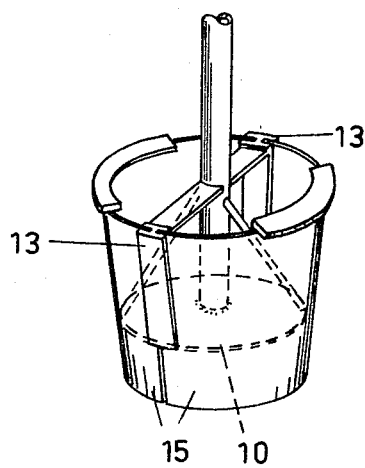
FIG. 3.
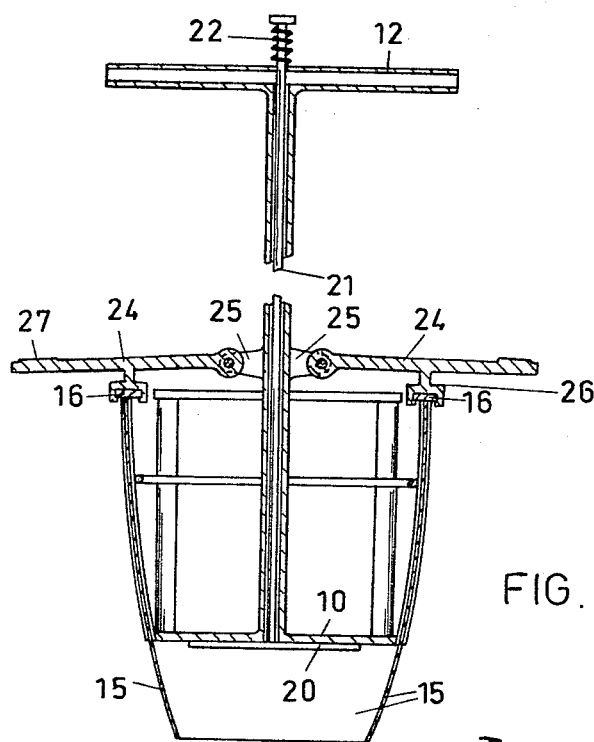
FIG. 4.
INVENTOR:
CHARLES JOHN PHILIP SMITH
BY:
Burger, Dinklage & Sprung

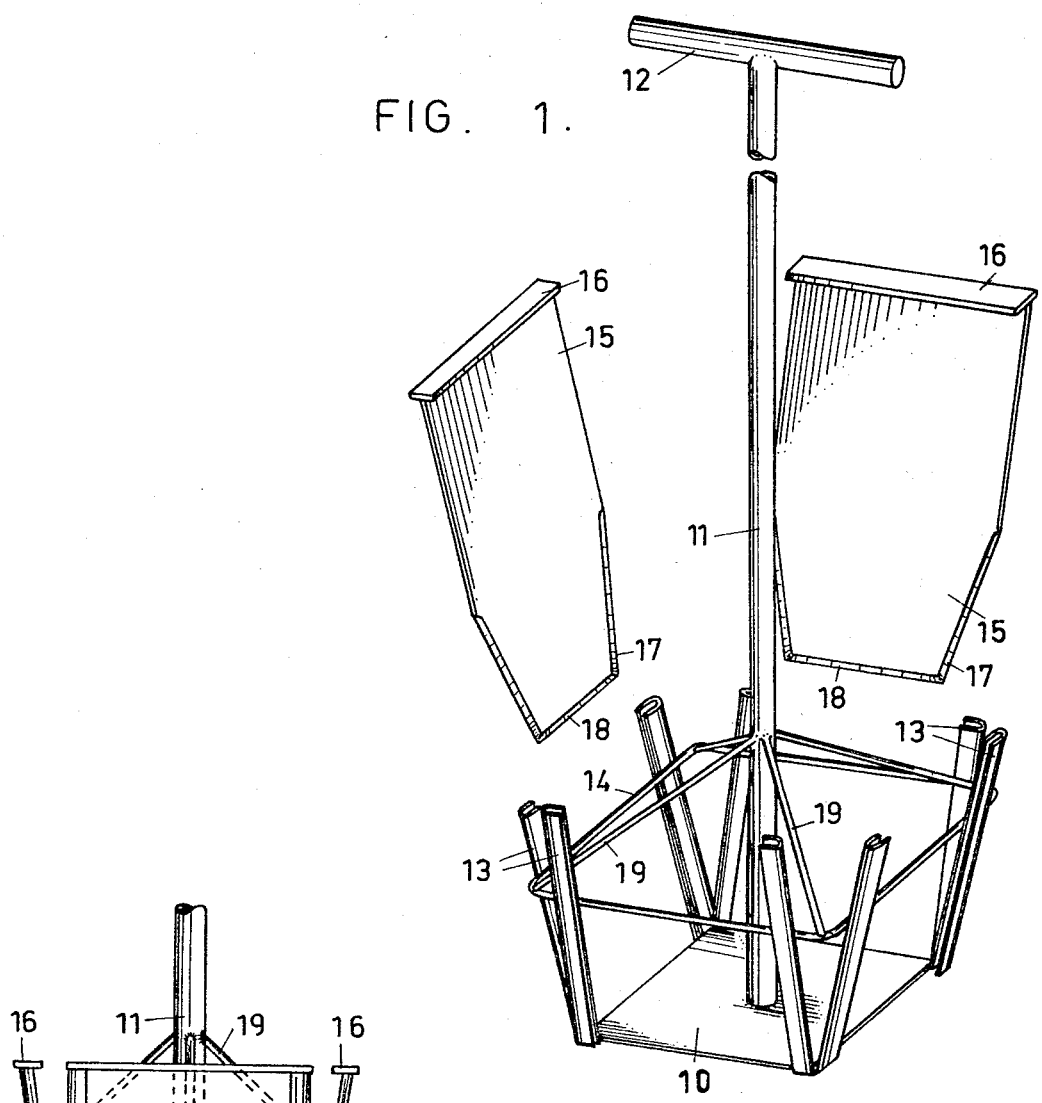

3,319,988
APPARATUS FOR MANUALLY DIGGING OUT SODS OF TURF
Charles J. P. Smith, 274 Forest Road, Bexley, New South Wales, Australia
Filed Jan. 28, 1965, Ser. No. 428,658
Claims priority, application Australia, Feb. 19, 1964, 41,118/64
7 Claims. (Cl. 294—50.8)

This invention relates to apparatus for manually digging out sods of turf.

The object of the invention is to provide apparatus which is simple to operate and which can be used for digging out sods of turf which are substantially uniform in size and which are adapted to fit together and/or fit into a space where a sod has been removed by the device.

The present invention provides apparatus for manually digging out sods of turf comprising a four-sided plate adapted to be placed on the surface of the turf, a plurality of cutter blades mounted in guides secured to the plate and arranged to be driven into the turf to cooperate with the plate to remove a piece of sod from the turf when the apparatus is displaced away from the turf.

The apparatus of the present invention is particularly useful to greenkeepers and the like. A worn or diseased patch of turf can be cut out and replaced by a substantially identical sized sod cut from a reserve area or nursery. Because the replacement sod is cut to the same dimensions as the sod removed, it can be fitted into place with a minimum of difficulty and the surface of the turf can be restored with a minimum of delay.

The blades are driven into the ground in a direction which is substantially vertical to the plane of the plate or which is inclined to the plane of the plate and extends underneath the plate.

The invention will be better understood by reference to the following description of typical preferred embodiments thereof of which are described with reference to the following drawings in which:

FIGURE 1 is an exploded pictorial view of one embodiment of this invention.

FIGURE 2 is a side elevation of the assembled construction of FIGURE 1.

FIGURE 3 is a pictorial view of another embodiment of the invention.

FIGURE 4 is a sectional side elevation view of a further embodiment of the invention.

In the first embodiment the plate 10 is approximately 6″ square and has a handle 11 projecting upwardly from the centre thereof, a short cross arm 12 being fixed to the top of the handle 11. A pair of guide channels 13 are fixed to each corner of the plate 10 so that they project upwardly from the plate 10 and diverge outwardly. The upper or handle ends of the guide channels 13 are fixd together by means of a square brace 14 formed from rod. A cutter member 15 is slidably mounted between each pair of guide channels 13. The upper end of each cutter member has a lateral flange 16 formed integral therewith or fixed thereto. The lower corners of each cutter member 15 are chamfered at 17 and the lower edge 18 and the corners 17 are sharpened in a manner similar to a spade. Struts 19 extend from the handle 11 to the corners of the square brace 14 to stiffen the structure.

In use, the plate 10 is placed on the surface of the turf with the cutter members in the fully raised position and the handle 11 held in a substantially vertical position. The operator then forces each of the cutter members 15 into the turf with his foot, preferably using short sharp jabs to achieve penetration. After all the cutter members 15 have been driven into the turf to the fullest extent as shown in FIGURE 2, the operator pulls upwardly on the handle 11 so that the sod can be extracted. The sod is in the form of a substantially inverted frusto square pyramid having an upper surface approximately 6″ square and a bottom surface approximately 4″ square and a depth of approximately 4″. Due to the fact that the bottom surface is only 4″ square, the operator can readily break the sod away from the body of the turf without the need for undercutting.

In another embodiment shown in FIGURE 3 the cutter members 15 are so shaped that they fit around two adjacent sides of the plate, similarly the plate may be of any desired shape from triangular to a polygon having any desired number of sides.

If desired the apparatus may be fitted with an ejector plate 20 as shown in FIGURE 4 which fits immediately below the main plate 10 and is connected to one end of an operating rod 21 which passes through the handle with the upper end of the operating rod projecting from the top of the handle 12.

A biassing spring 22 retains the ejector plate 20 against the main plate 10.

Levers 24 may be provided to force the cutter members 15 into the turf. The inner end of each lever 24, only two of which are shown, is pivotally mounted on lugs 25 on the handle so that each lever projects outwardly therefrom and bears against the upper edge 16 of the cutter member 15 with which it is associated by means of a contact portion 26. A foot pad 27 is provided on the outer end of the lever 24.

The cutter members 15 instead of being flat are slightly arcuate as shown in the construction of FIGURE 4, the guide channels 13 being shaped to correspond so that the sod which is cut will have convex sides instead of flat sides.

I claim:

1. Apparatus for manually digging out sods of turf comprising a four sided plate adapted to be placed on the surface of the turf, a pair of channel shaped guides secured to each side with each guide being located adjacent to a respective corner of the plate, the guides on each side of the plate being opposed and having the open channel side of one guide directed towards the open channel side of the other guide, the guides being divergent above the plate, a brace member secured to the divergent ends of the guides, a handle secured to the plate and the brace and extending between and beyond the guides, a cutter blade slidably mounted in each pair of opposed guides and drivable into the turf to cooperate with the plate to remove a piece of sod from the turf when the apparatus is displaced away from the turf by rocking the handle.

2. Apparatus as claimed in claim 1 wherein the cutter blades are chamfered along their lower side edges so that each blade along the chamfered edge engages the adjacent chamfered edge of the adjacent blade when the blades are driven into the turf below the lower ends of the guides.

3. Apparatus as claimed in claim 1 wherein each cutter blade has a transverse upper edge to serve as a foot pad.

4. Apparatus as claimed in claim 1 wherein levers are pivotally mounted on the handle for cooperation with each blade, each lever having a portion for engaging its blade and a foot pad portion to receive an operator's foot for driving the blade into the turf.

5. Apparatus for manually digging out sods of turf comprising a plate having two arcuate sides and adapted to be placed on the surface of the turf, a channel shaped guide secured to each side adjacent each end thereof, the adjacent guides being opposed with their channels directed away from each other, a brace member securing the upper ends of the guides, a handle secured to the plate and extending above the guides and secured to the brace member, a curved cutter blade slidably mounted in each pair of opposed guides and drivable into the turf to cooperate with the plate to remove a piece of sod from the turf when the apparatus is displaced away from the turf by rocking the handle, and including an ejector plate positioned below the plate and operable by means of an operating rod extending through the plate and handle.

6. Apparatus for manually digging out sods of turf comprising a plate having two arcuate sides and adapted to be placed on the surface of the turf, a channel shaped guide secured to each side adjacent each end thereof, the adjacent guides being opposed with their channels directed away from each other, a brace member securing the upper ends of the guides, a handle secured to the plate and extending above the guides and secured to the brace member, a curved cutter blade slidably mounted in each pair of opposed guides and drivable into the turf to cooperate with the plate to remove a piece of sod from the turf when the apparatus is displaced away from the turf by rocking the handle, and including an ejector plate positioned on the turf side of the plate and arranged to be actuated by a rod extending through the plate, handle and transverse gripping portion to eject the sod from the apparatus.

7. Apparatus for manually digging out sods of turf comprising a four sided plate adapted to be placed on the surface of the turf, a pair of channel shaped guides secured to each side with each guide being located adjacent to a respective corner of the plate, the guides on each side of the plate being opposed and having the open channel side of one guide directed towards the open channel side of the other guide, the guides being divergent above the plate, a brace member secured to the divergent ends of the guides, a handle secured to the plate and the brace and extending between and beyond the guides, a cutter blade slidably mounted in each pair of opposed guides and drivable into the turf to cooperate with the plate to remove a piece of sod from the turf when the apparatus is displaced away from the turf by rocking the handle and an ejector plate positioned below the plate for ejecting the sod with the blades retracted towards the divergent ends of the guides, the ejector plate being operable by an operating rod passing through the plate and the handle.

References Cited by the Examiner
UNITED STATES PATENTS

| | | | |
|---|---|---|---|
| 1,783,026 | 11/1930 | Ober | 294—50.5 |
| 2,035,967 | 3/1936 | Humphery | 294—50.5 |
| 2,729,493 | 1/1956 | Engel | 294—50.8 |
| 2,740,234 | 4/1956 | Norman | 294—50.7 |

GERALD M. FORLENZA, *Primary Examiner.*

G. F. ABRAHAM, *Assistant Examiner.*